United States Patent
Zhang et al.

(10) Patent No.: US 8,346,965 B2
(45) Date of Patent: Jan. 1, 2013

(54) SYSTEMS AND METHODS FOR MULTI-LAYER TRAFFIC GROOMING

(75) Inventors: Qiong Zhang, Plano, TX (US); Paparao Palacharla, Richardson, TX (US); Qingya She, Plano, TX (US); Xi Wang, Murphy, TX (US); Motoyoshi Sekiya, Richardson, TX (US)

(73) Assignee: Fujitsu Limited, Kawasaki-Shi (JP)

( * ) Notice: Subject to any disclaimer, the term of this patent is extended or adjusted under 35 U.S.C. 154(b) by 252 days.

(21) Appl. No.: 12/942,586

(22) Filed: Nov. 9, 2010

(65) Prior Publication Data

US 2012/0117269 A1 May 10, 2012

(51) Int. Cl.
G06F 15/16 (2006.01)

(52) U.S. Cl. ............ 709/241; 709/242; 370/238

(58) Field of Classification Search ......... 709/200–202, 709/224, 241–242; 370/221, 235, 238, 252
See application file for complete search history.

(56) References Cited

U.S. PATENT DOCUMENTS

| | | | | |
|---|---|---|---|---|
| 7,362,974 B2 * | 4/2008 | De Patre et al. | .............. | 398/50 |
| 7,580,632 B1 * | 8/2009 | Feuer et al. | .............. | 398/32 |
| 7,725,035 B2 * | 5/2010 | Tyan et al. | .............. | 398/115 |
| 2005/0069314 A1 * | 3/2005 | De Patre et al. | .............. | 398/5 |
| 2005/0232157 A1 * | 10/2005 | Tyan et al. | .............. | 370/237 |
| 2005/0237950 A1 * | 10/2005 | Yuan et al. | .............. | 370/255 |
| 2005/0271038 A1 * | 12/2005 | Xin et al. | .............. | 370/351 |
| 2012/0087665 A1 * | 4/2012 | Li et al. | .............. | 398/79 |

OTHER PUBLICATIONS

Hongyue Zhu et al., "A Novel Generic Graph Model for Traffic Grooming in Heterogeneous WDM Mesh Networks", IEEE/ACM Transactions on Networking, vol. 11, No. 2, pp. 285-299, Apr. 2003.

* cited by examiner

*Primary Examiner* — Moustafa M Meky
(74) *Attorney, Agent, or Firm* — Baker Botts L.L.P.

(57) ABSTRACT

A method may include constructing an auxiliary graph for a network comprising a plurality of network elements, the network elements having an Internet Protocol layer, a lower layer, and a wavelength layer, the auxiliary graph including a plurality of directed edges, the plurality of directed edges indicative of connectivity of components of the plurality of network elements. The method may further include: (i) deleting directed edges from the auxiliary graph whose available bandwidth is lower than the required bandwidth of a selected demand; (ii) finding a path for the demand on the auxiliary graph via remaining directed edges; (iii) deleting at least one directed edge of the auxiliary graph on the wavelength layer along the path; (iv) adding lower layer lightpath edges to the auxiliary graph for a lower layer lightpath for the path; and (v) converting lower layer lightpaths to Internet Protocol lightpaths if a conversion condition is satisfied.

21 Claims, 8 Drawing Sheets

SYSTEMS AND METHODS FOR MULTI-LAYER TRAFFIC GROOMING

TECHNICAL FIELD

This disclosure relates generally to the field of communications systems and more specifically to traffic grooming among multiple communications layers of a network element.

BACKGROUND

A communication network may include network elements that route packets through the network. Communications networks often have Internet Protocol (IP) backbones, which often include many routers to route and forward network traffic to the various network elements. Network elements are often sparsely coupled in a network, and a significant portion of traffic may be communicated between network elements that do not have direct IP adjacency—such traffic must pass through one or more intermediate IP routers. However, router ports are often considered the most "expensive" ports in an IP architecture in terms of cost of establishing and maintaining a network, particularly in networks utilizing wavelength division multiplexing (WDM) or similar optical communication technology.

Traffic grooming is the process of grouping many small telecommunications flows into larger units, which may be processed as single entities. For example, in a network using WDM, two network flows which are destined for a common node can be placed on the same wavelength, allowing them to be dropped by a single optical add-drop multiplexer. Often the objective of grooming is minimizing the cost of the network.

Although traffic grooming has been utilized to reduce the costs of implementing communications networks, such approaches do not permit traffic grooming at multiple layers of a network, thus limiting effectiveness of these traditional approaches to traffic grooming.

SUMMARY OF THE DISCLOSURE

In accordance with the present disclosure, disadvantages and problems associated with traditional approaches to traffic grooming may be reduced or eliminated.

In accordance with certain embodiments of the present disclosure, a method may include constructing an auxiliary graph for a network comprising a plurality of network elements, the network elements having an Internet Protocol layer, a lower layer, and a wavelength layer, the auxiliary graph including a plurality of directed edges, the plurality of directed edges indicative of connectivity of components of the plurality of network elements. The method may further include, for a selected demand of the network: (i) deleting directed edges from the auxiliary graph whose available bandwidth is lower than the required bandwidth of the demand; (ii) finding a path for the demand on the auxiliary graph via remaining directed edges; (iii) deleting at least one directed edge of the auxiliary graph on the wavelength layer along the path; (iv) adding lower layer lightpath edges to the auxiliary graph for a lower layer lightpath for the path; and (v) converting lower layer lightpaths to Internet Protocol lightpaths if a conversion condition is satisfied.

Certain embodiments of the disclosure may provide one or more technical advantages. A technical advantage may be a network that supports traffic grooming on multiple layers.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1-4E, like numerals being used for like and corresponding parts of the various drawings.

Figure 1:
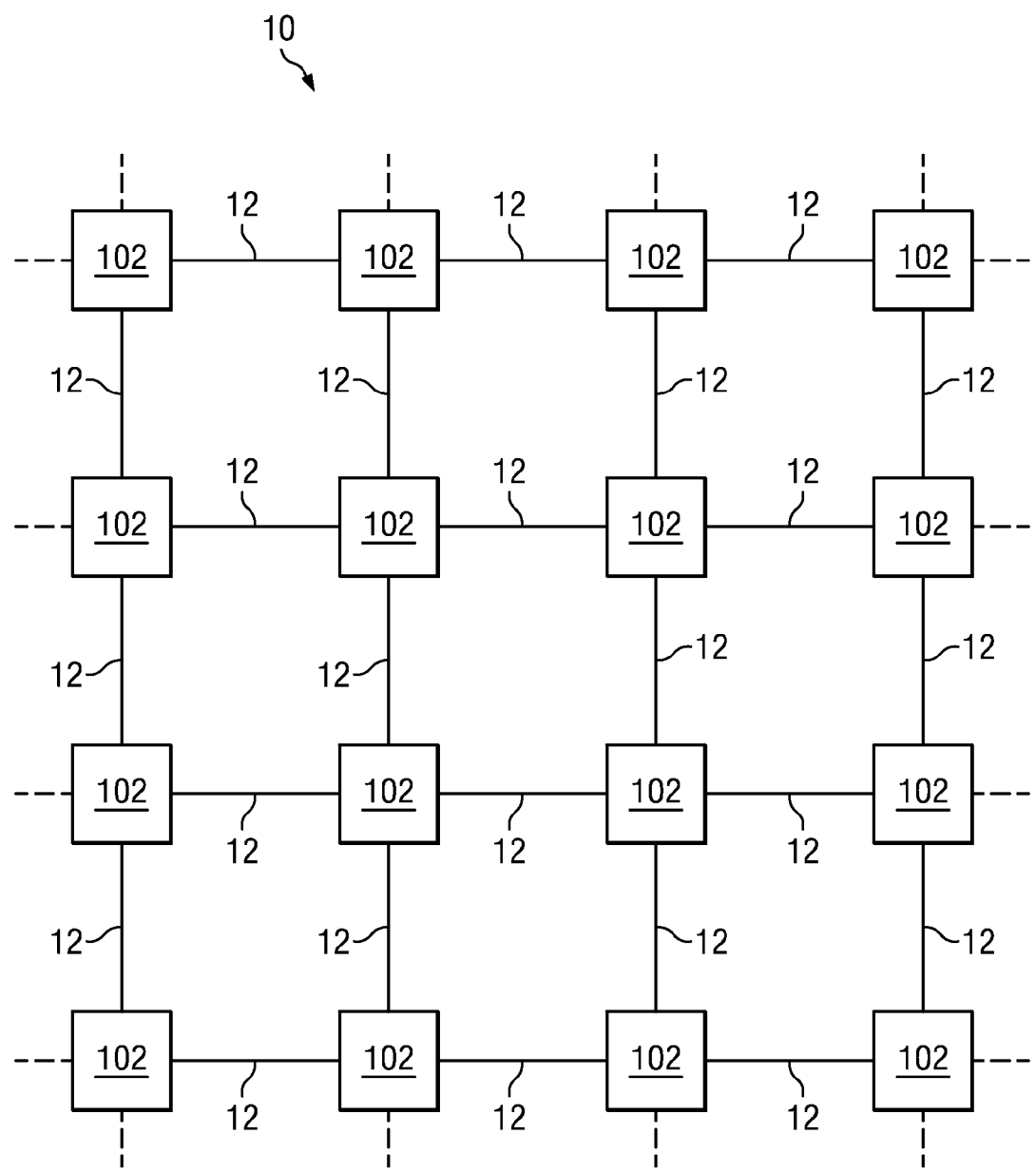
FIG. 1 illustrates a block diagram of an example communication network, in accordance with certain embodiments of the present disclosure.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
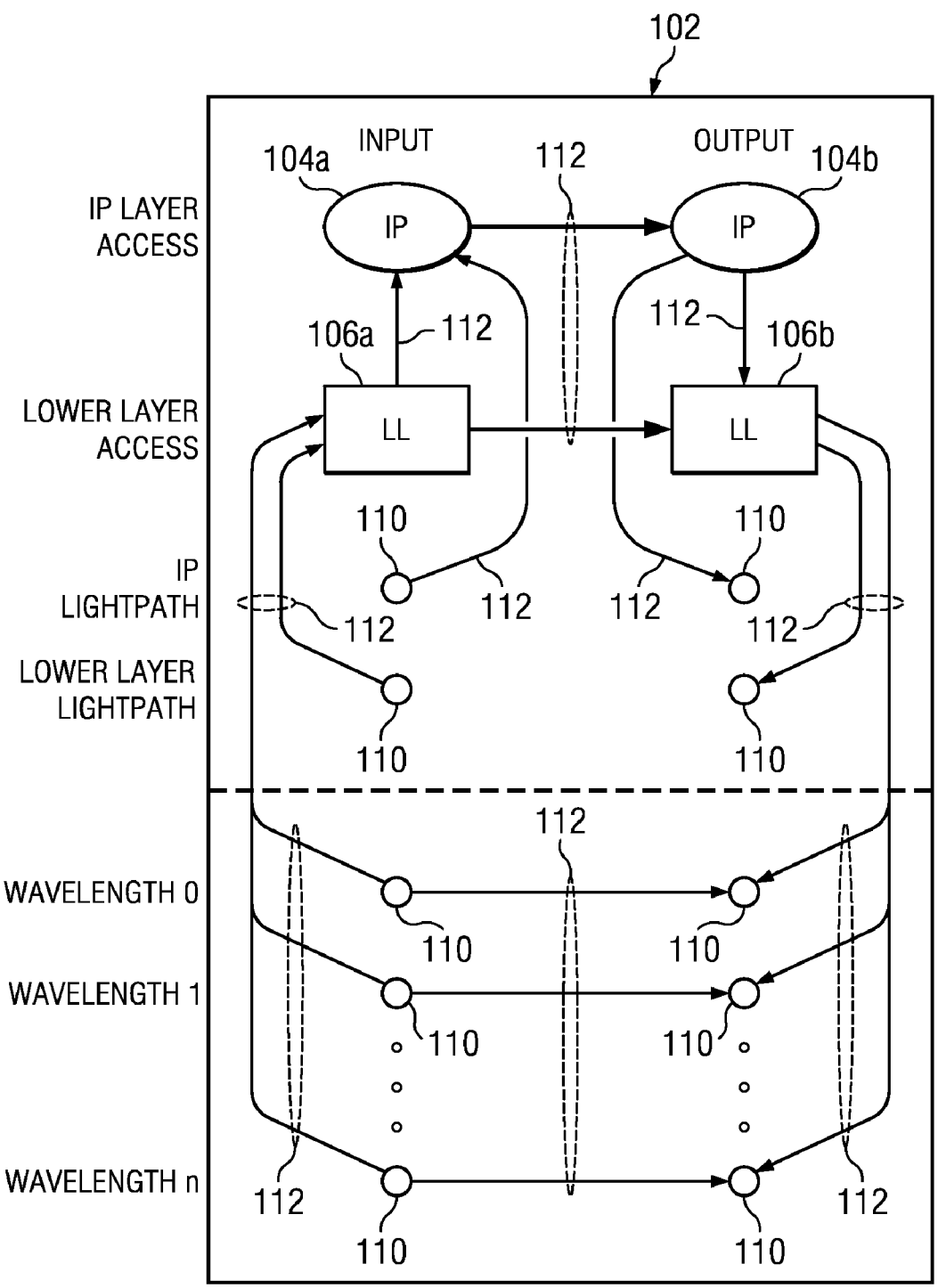
FIG. 2 illustrates a block diagram of selected components of an example network element and an auxiliary graph among such components, in accordance with certain embodiments of the present disclosure.

FIG. 2 illustrates a block diagram of selected components of an example network element 102 and an auxiliary graph among such components, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, a network element 102 may include IP layer access modules 104, lower layer access modules 106, and ports 110. An IP layer access module 104 may include any system, device, or apparatus configured to route and/or forward network traffic, in particular Internet Protocol packets. As shown in FIG. 2, a network element 102 may include an input IP layer access module 104a for network traffic received by network element 102, and an output IP layer access module 104b for traffic to be forwarded by network element 102.

A lower layer access module 106 may include any system, device, or apparatus configured to perform transport, multiplexing, switching, management, and/or supervision of traffic. A lower layer access module 106 may implement any suitable standard or protocol. For example, in some embodiments, a lower layer access module 106 may implement the Optical Transport Network (OTN) standard (e.g., as defined by International Telecommunication Union (ITU) standard G.709). As another example, in other embodiments, a lower layer access module 106 may implement the Multiprotocol Label Switching Transport Profile (MPLS-TP) standard. As shown in FIG. 2, a network element 102 may include an input lower layer access module 106a for network traffic received by network element 102, and an output lower layer access module 106b for traffic to be forwarded by network element 102.

Each port 110 may include any system, device or apparatus configured to serve as a physical interface between a corresponding transmission medium 12 and a network element 102. For example, a port 110 may comprise an optical port. As indicated in FIG. 2, a pair of ports 110 (input and output) may be associated with IP layer access modules 104. Such ports 110 may provide lightpaths between IP layer access modules 104 of adjacent network elements 102. Similarly, a pair of ports 110 (input and output) may be associated with lower layer access modules 106. Such ports 110 may provide lightpaths between lower layer access modules 106 of adjacent network elements 102.

Other ports 110 may be associated with various wavelengths or channels (shown as wavelengths 0 through n in FIG. 2) for wavelength-division multiplexed signals. Wavelength-division multiplexing (WDM) is a technology whereby multiple optical carrier signals are coupled into a single optical fiber by using different wavelengths of laser light to carry different signals. This allows for a multiplication in capacity of one strand of fiber. Ports 110 associated with WDM wavelengths may be considered to be part of a wavelength layer for a network element 102.

The various components of network element 102 (e.g., IP layer access modules 104, lower layer access modules 106, and ports 110) may be communicatively coupled to each other in any suitable manner. An example configuration of the communicative coupling among network element 102 is depicted in FIG. 2 by edges 112. Edges 112 may constitute directed edges of an auxiliary graph that indicate the connectivity among components of a network element 102, as well as the direction of traffic flow through such edges.

Figure 3:
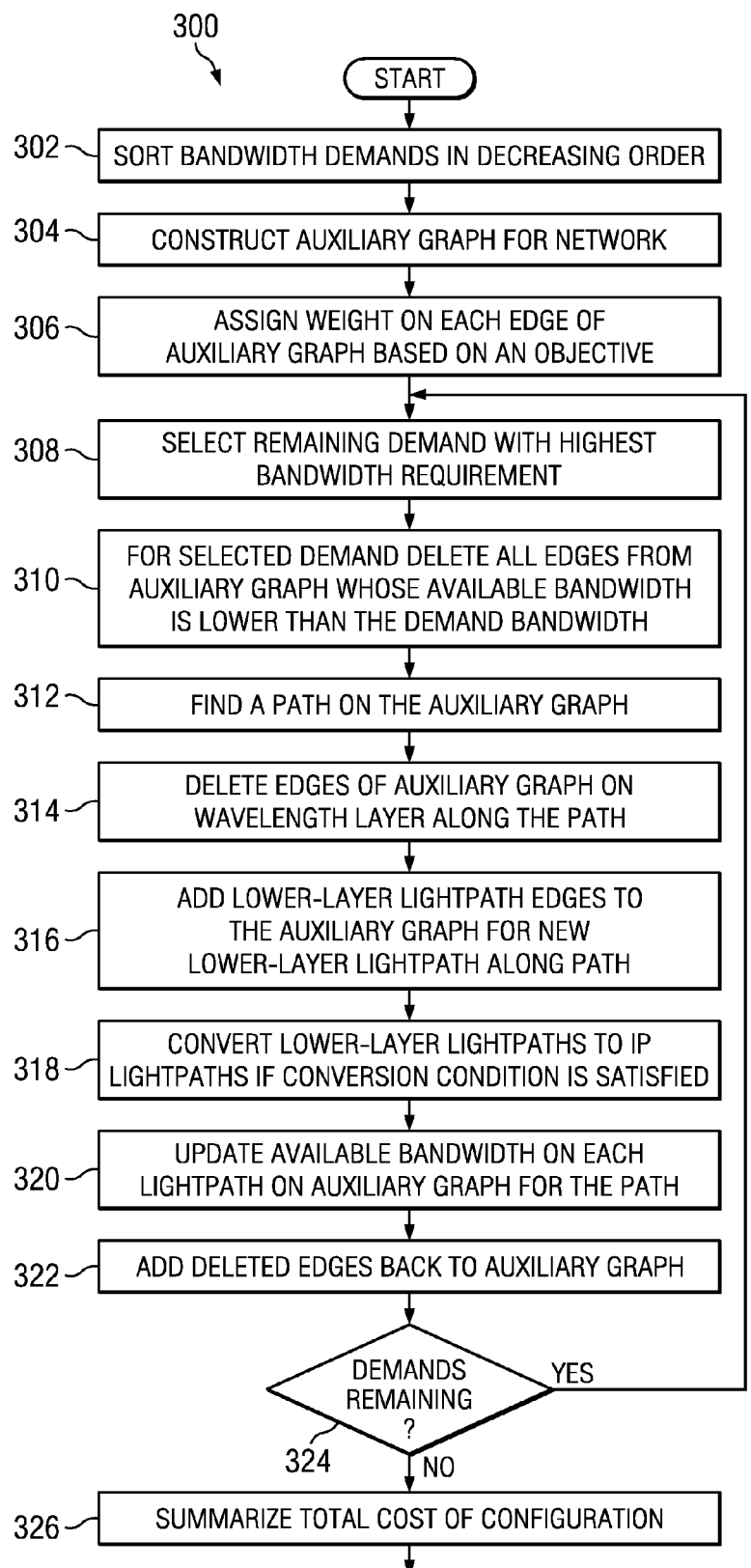
FIG. 3 illustrates a flow chart of an example method for multi-layer grooming in a communication network, in accordance with certain embodiments of the present disclosure.

FIG. 3 illustrates a flow chart of an example method 300 for multi-layer grooming in a communication network, in accordance with certain embodiments of the present disclosure. FIGS. 4A-4E illustrate a block diagram of selected components of an example network and an auxiliary graph among such components at various steps of method 300, in accordance with certain embodiments of the present disclosure.

According to some embodiments, method 300 may begin at step 302. As noted above, teachings of the present disclosure may be implemented in a variety of configurations of network 10. As such, the preferred initialization point for method 300 and the order of the steps 302-326 comprising method 300 may depend on the implementation chosen.

At step 302, a suitable component of a network element 102 or other device may sort bandwidth demands of a network comprising a plurality of network elements 102, in decreasing order of required bandwidth.

Figure 4A:
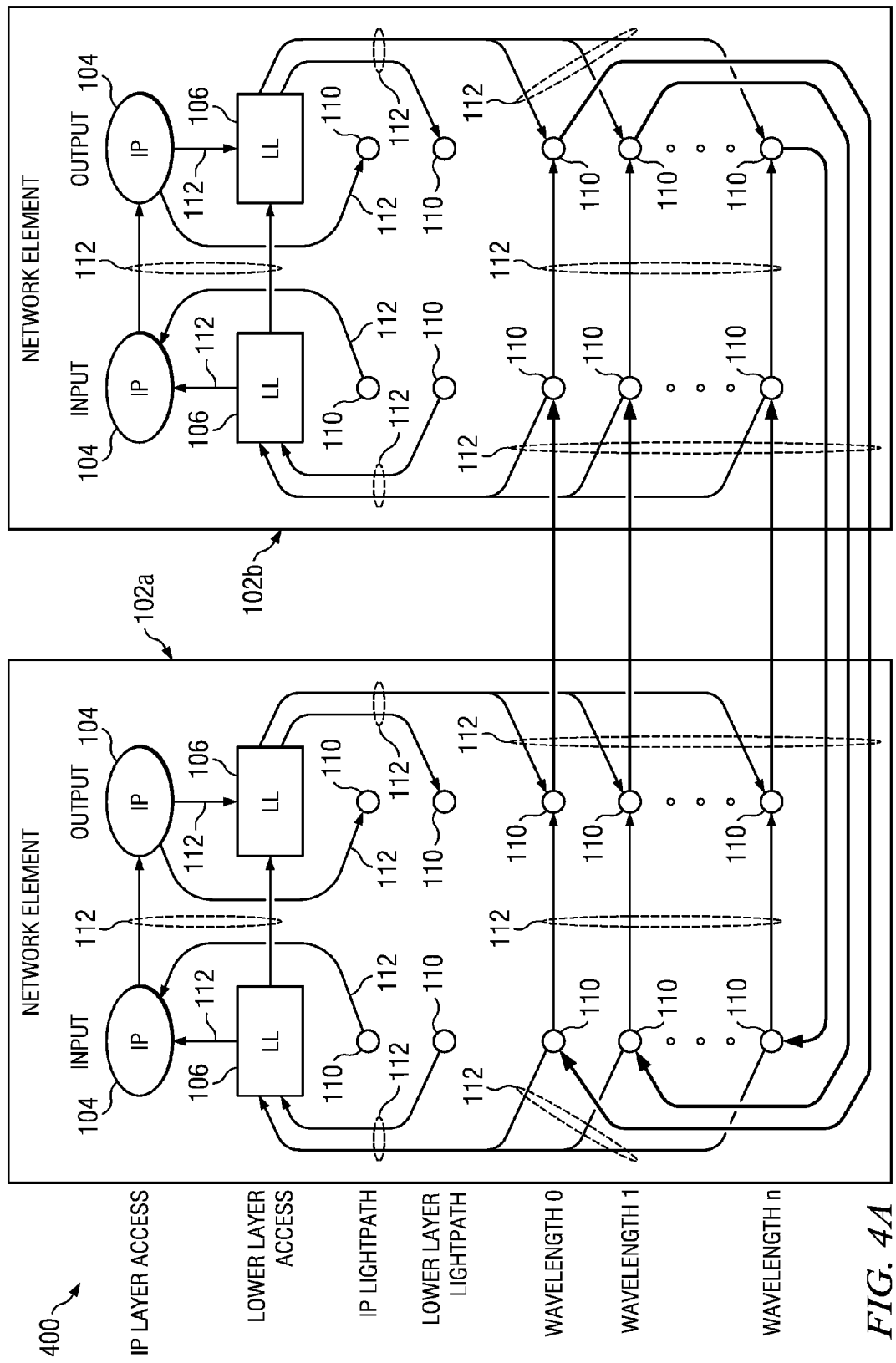
FIGS. 4A-4E illustrate a block diagram of selected components of an example network and an auxiliary graph among such components, in accordance with certain embodiments of the present disclosure.
Figure 4B:
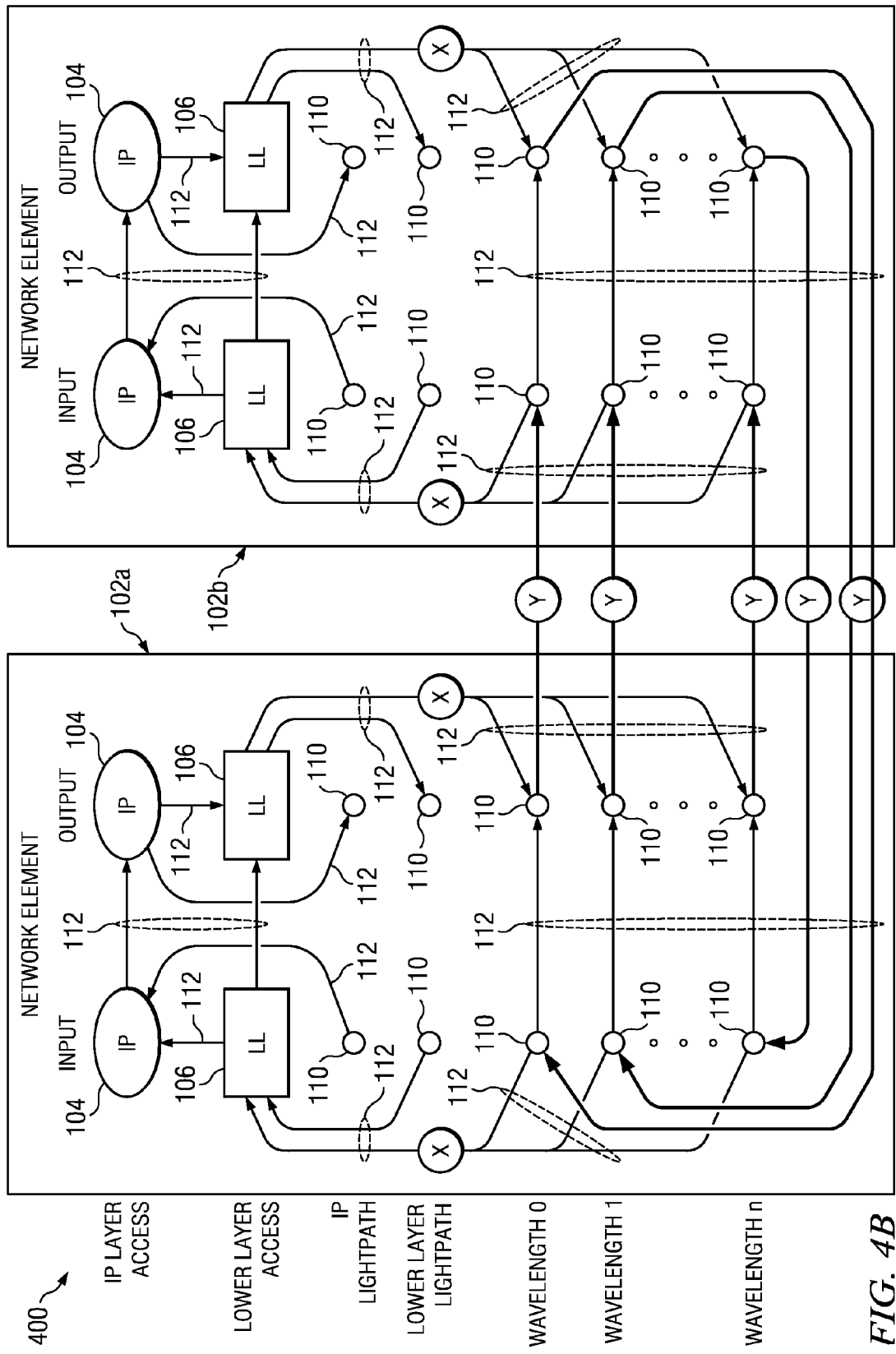

At step 304, a suitable component of a network element 102 or other device may construct an auxiliary graph for the network. Step 304 is illustrated in FIG. 4A, which, for simplicity, depicts a network 400 comprising two network elements 102a and 102b. As shown in FIG. 4A, an auxiliary graph for the example network 400 may comprise the individual auxiliary graphs of each network element 102 (e.g., as shown in FIG. 2), with additional directed edges 112 coupling output ports 110 for the various wavelengths of the wavelength layer of one network element 102, to corresponding input ports 110 of the other network element 102.

At step 306, a suitable component of a network element 102 or other device may assign a weight to each edge 112 of the auxiliary graph based on an objective for the configuration of the network. For example, an objective for a network configuration may be to minimize the number of transponders/lightpaths required. In such a case, large weights (indicative of high cost) may be assigned to edges 112 of example network 400 labeled with an X in FIG. 4B. As another example, an objective for a network configuration may be to minimize cost in terms of IP ports, transponders, and signal regenerators. In such a case, large weights may be assigned to edges labeled edges 112 of example network 400 labeled with an X or a Y in FIG. 4B.

At step 308, a suitable component of a network element 102 or other device may select the remaining demand with the highest bandwidth requirement in accordance with the sort of bandwidth demands undertaken at step 302.

At step 310, a suitable component of a network element 102 or other device may, for the selected demand, delete all edges 112 from the auxiliary graph of the network whose available bandwidth is lower than the demand bandwidth.

Figure 4C:
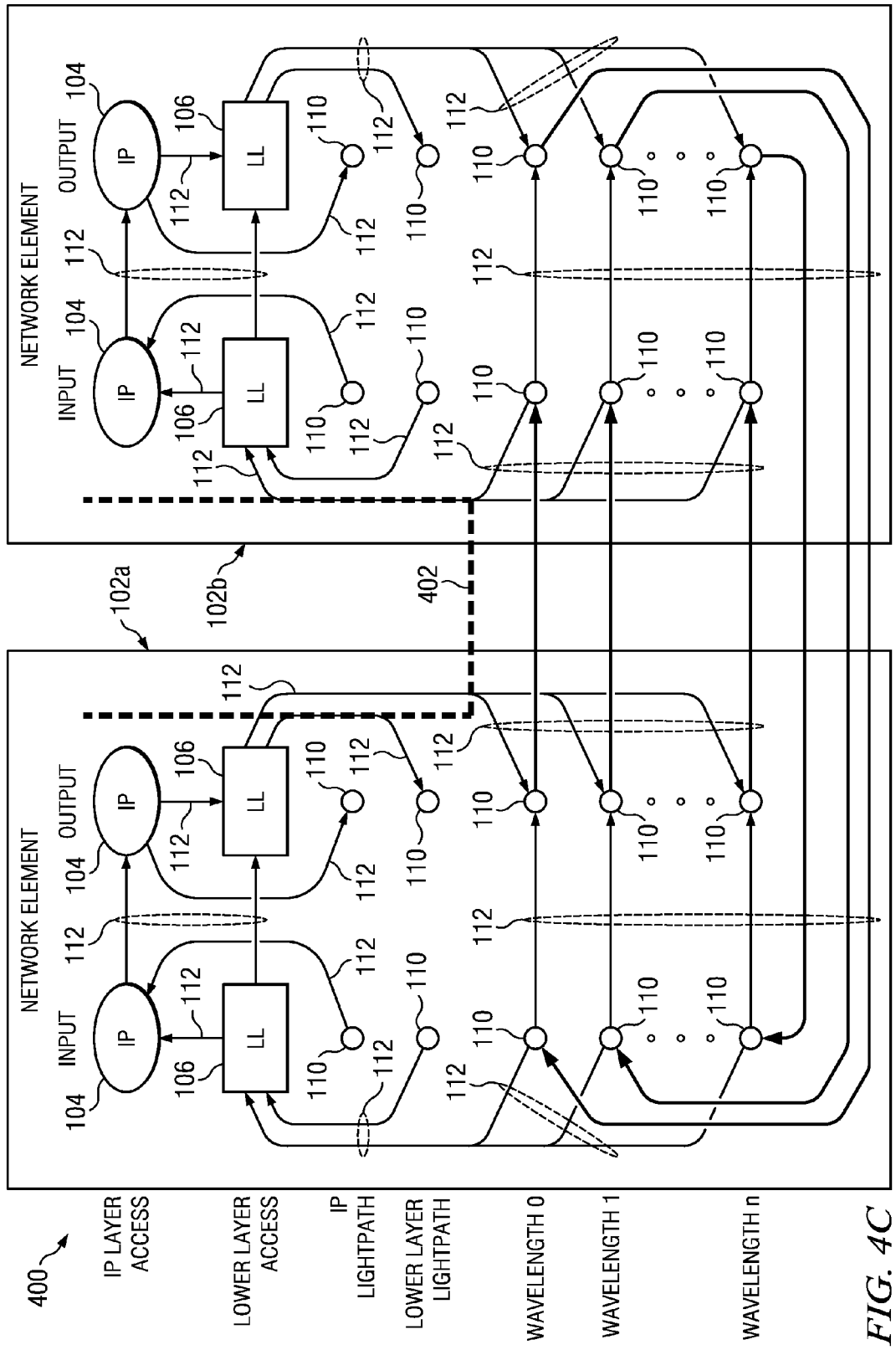
Figure 4D:
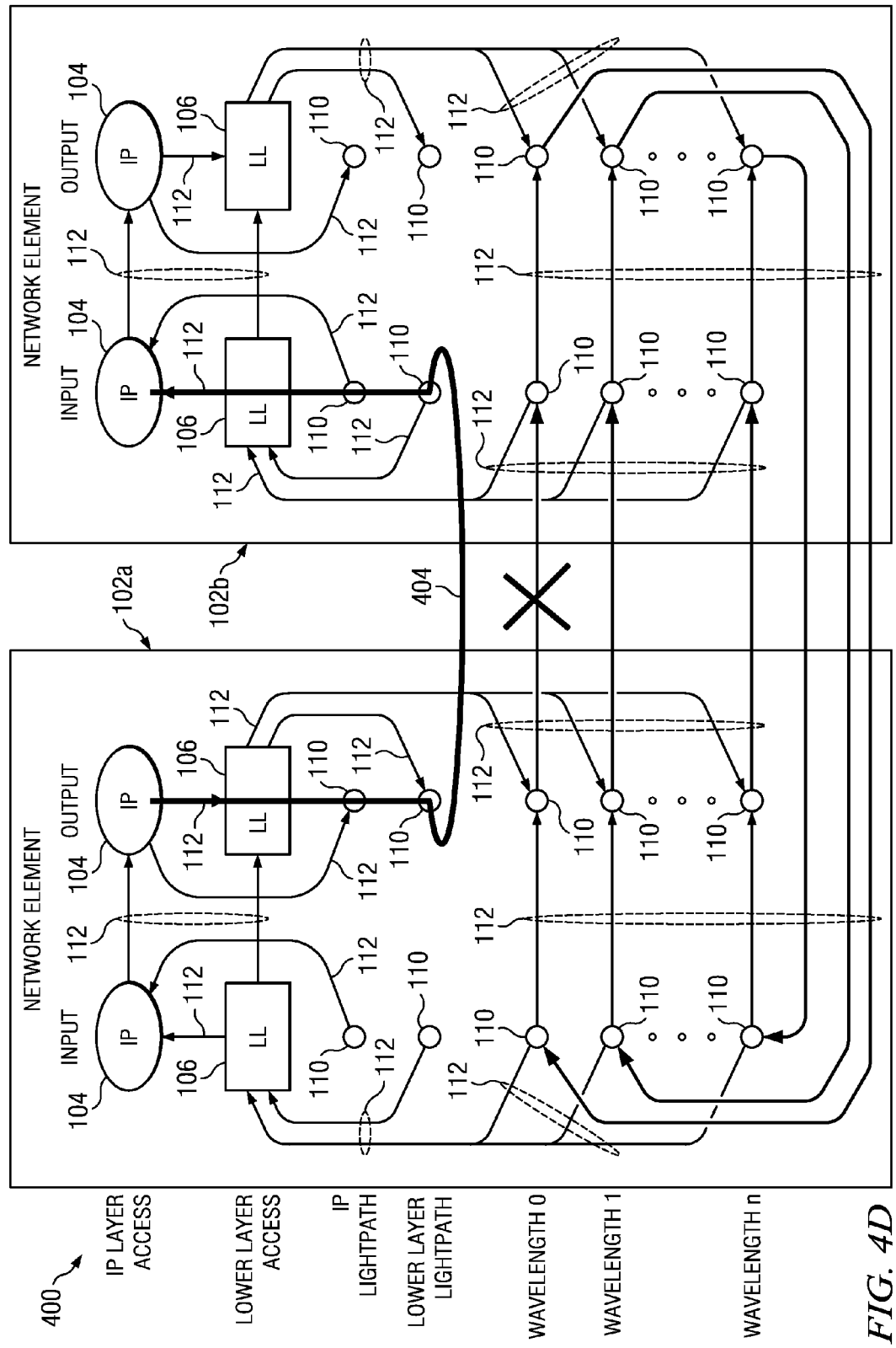
Figure 4E:
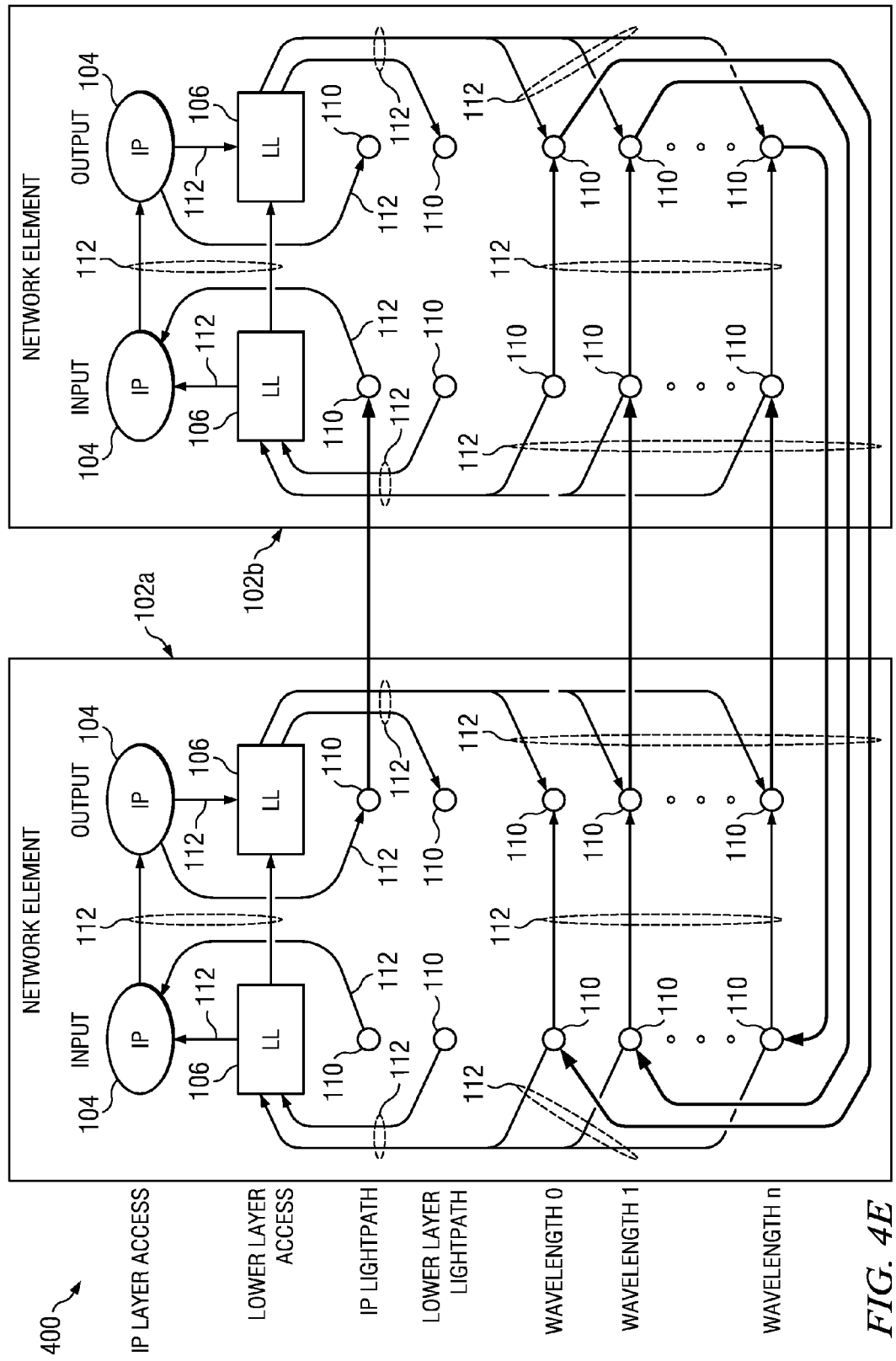

At step 312, a suitable component of a network element 102 or other device may find a path on the auxiliary graph of the network, as illustrated by path 402 depicted in FIG. 4C. In some embodiments, the path may be found using shortest path routing.

At step 314, a suitable component of a network element 102 or other device may delete edges 112 of the auxiliary graph on the wavelength layer along the path. For example, as shown in network 400 of FIG. 4D, an edge 112 associated with wavelength 0 of the wavelength layer may be deleted.

At step 316, a suitable component of a network element 102 or other device may add edges 112 to the auxiliary graph for a new lower-layer lightpath along the path. For example, as shown in network 400 of FIG. 4D, a new edge may be added for lower-level lightpath 404.

At step 318, a suitable component of a network element 102 or other device may convert a lower-level lightpath to an IP lightpath if a conversion condition is satisfied. For example, one condition may provide that conversion from lower-level lightpath to an IP lightpath is to occur if such conversion would not increase the number of IP ports, such as depicted in network 400 of FIG. 4E. Such a condition may reduce usage of lower-level ports while maintaining the same number of IP ports, and such conversion might take place when a demand has a bandwidth requirement approximately equal to the lightpath capacity. As another example, another condition may provide that conversion may occur if the number of used lower-level lightpath slots are greater than a threshold and bandwidth utilization is below a second threshold. Such a conversion would increase the number of IP ports, but may increase utilization of lightpaths while saving lower level and wavelength layer paths. If a lower layer lightpath is converted into an IP level lightpath, a suitable component of a network element 102 or other device may update the auxiliary graph accordingly (e.g., may delete the lower layer lightpath edge 112 from the auxiliary graph, and add an edge 112 for the IP layer lightpath).

At step 320, a suitable component of a network element 102 or other device may update the available bandwidth on each lightpath on auxiliary graph based on the lightpath configuration for the demand. For example, if the demand is assigned to a particular edge 112, the bandwidth availability for such edge 112 may be reduced by the bandwidth requirements of the demand.

At step 322, a suitable component of a network element 102 or other device may add back all deleted edges 112 of the auxiliary graph (e.g., those edges deleted at steps 310 and 314).

At step 324, a suitable component of a network element 102 or other device may determine if any other demands are remaining. If bandwidth demands remain, method 300 may proceed again to step 308. If no bandwidth demands remain, method 300 may proceed to step 326.

At step 326, after all demands have been processed, a suitable component of a network element 102 or other device may summarize the total cost of the configuration. In some embodiments, method 300 may iteratively proceed again to step 306, where new weights may be assigned and another total cost may be determined in accordance with steps 308-326, after which the configuration associated with the lowest cost configuration may be selected as the desired configuration.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network elements 102 or any other system(s) operable to implement method 300. In certain embodiments, method 300 may be implemented partially or fully in software and/or firmware embodied in memory.

A component of network 10, a network element 102, or network 400 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), application specific integrated circuit (ASIC), field-programmable gate array (FPGA), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10, a network element 102, and/or network 400 without departing from the scope of the disclosure. The components of network 10, a network element 102, and/or network 400 may be integrated or separated. Moreover, the operations of network 10, a network element 102, and/or network 400 may be performed by more, fewer, or other components. Additionally, operations of network 10, a network element 102, and/or network 400 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
constructing an auxiliary graph for a network comprising a plurality of network elements, the network elements having an Internet Protocol layer, a lower layer, and a wavelength layer, the auxiliary graph including a plurality of directed edges, the plurality of directed edges indicative of connectivity of components of the plurality of network elements; and for a selected demand of the network:
  deleting directed edges from the auxiliary graph whose available bandwidth is lower than the required bandwidth of the demand;
  finding a path for the demand on the auxiliary graph via remaining directed edges;
  deleting at least one directed edge of the auxiliary graph on the wavelength layer along the path;
  adding lower layer lightpath edges to the auxiliary graph for a lower layer lightpath for the path; and
  converting lower layer lightpaths to Internet Protocol lightpaths if a conversion condition is satisfied.

2. A method according to claim 1, further comprising assigning weights to each directed edge of the auxiliary graph.

3. A method according to claim 2, wherein finding a path for the demand on the auxiliary graph via remaining directed edges comprises finding a path based on the weights.

4. A method according to claim 1, further comprising updating available bandwidth on each directed edge on the auxiliary graph associated with a lightpath based on lightpath configuration for the demand.

5. A method according to claim 1, further comprising:
  adding back deleted edges of the auxiliary graph; and
  selecting a second demand; and
  for the second selected demand:
    deleting directed edges from the auxiliary graph whose available bandwidth is lower than the required bandwidth of the second demand;
    finding a second path for the second demand on the auxiliary graph via remaining directed edges;
    deleting at least one directed edge of the auxiliary graph on the wavelength layer along the second path;
    adding lower layer lightpath edges to the auxiliary graph for a lower layer lightpath for the second path; and
    converting lower layer lightpaths to Internet Protocol lightpaths if a conversion condition is satisfied.

6. A method according to claim 5, further comprising determining a total cost for lightpath configurations for the demand and the second demand.

7. A method according to claim 6, further comprising:
  changing the weights for the directed edges;
  repeating the deleting, finding, adding, and converting steps for each of the demand and the second demand based on the changed weights;
  determining a second total cost for lightpath configurations for the demand and the second demand based on the changed weights; and
  selecting a configuration for the network based on a comparison of the total cost to the second total cost.

8. A network element comprising:
  an Internet Protocol layer having plurality of Internet Protocol layer access modules;
  a lower layer having a plurality of lower layer access modules;
  a wavelength layer supporting communication via a plurality of wavelength division multiplexed wavelengths;
  logic for constructing an auxiliary graph for a network comprising the network element and at least one second network element, the auxiliary graph including a plurality of directed edges, the plurality of directed edges indicative of connectivity of components of the network element and the at least one second network element;
  logic for selecting a demand of the network;
  logic for deleting directed edges from the auxiliary graph whose available bandwidth is lower than the required bandwidth of the demand;
  logic for finding a path for the demand on the auxiliary graph via remaining directed edges;
  logic for deleting at least one directed edge of the auxiliary graph on the wavelength layer along the path;
  logic for adding lower layer lightpath edges to the auxiliary graph for a lower layer lightpath for the path; and
  logic for converting lower layer lightpaths to Internet Protocol lightpaths if a conversion condition is satisfied.

9. A network element according to claim 8, further comprising logic for assigning weights to each directed edge of the auxiliary graph.

10. A network element according to claim 9, wherein the logic for finding a path for the demand on the auxiliary graph via remaining directed edges comprises logic for finding a path based on the weights.

11. A network element according to claim 8, further comprising logic for updating available bandwidth on each directed edge on the auxiliary graph associated with a lightpath based on lightpath configuration for the demand.

12. A network element according to claim 8, further comprising:
  logic for adding back deleted edges of the auxiliary graph;
  logic for selecting a second demand;
  logic for deleting directed edges from the auxiliary graph whose available bandwidth is lower than the required bandwidth of the second demand;
  logic for finding a second path for the second demand on the auxiliary graph via remaining directed edges;
  logic for deleting at least one directed edge of the auxiliary graph on the wavelength layer along the second path;
  logic for adding lower layer lightpath edges to the auxiliary graph for a lower layer lightpath for the second path; and
  logic for converting lower layer lightpaths to Internet Protocol lightpaths if a conversion condition is satisfied.

13. A network element according to claim 12, further comprising logic for determining a total cost for lightpath configurations for the demand and the second demand.

14. A network element according to claim 13, further comprising:
  logic for changing the weights for the directed edges;
  logic for determining a second total cost for lightpath configurations for the demand and the second demand based on the changed weights; and
  logic for selecting a configuration for the network based on a comparison of the total cost to the second total cost.

15. A system comprising:
  logic constructing an auxiliary graph for a network comprising a plurality of network elements, the network elements having an Internet Protocol layer, a lower layer, and a wavelength layer, the auxiliary graph including a plurality of directed edges, the plurality of directed edges indicative of connectivity of components of the plurality of network elements;
  logic for selecting a demand of the network;
  logic for deleting directed edges from the auxiliary graph whose available bandwidth is lower than the required bandwidth of the demand;
  logic for finding a path for the demand on the auxiliary graph via remaining directed edges;
  logic for deleting at least one directed edge of the auxiliary graph on the wavelength layer along the path;
  logic for adding lower layer lightpath edges to the auxiliary graph for a lower layer lightpath for the path; and
  logic for converting lower layer lightpaths to Internet Protocol lightpaths if a conversion condition is satisfied.

16. A system according to claim 15, further comprising logic for assigning weights to each directed edge of the auxiliary graph.

17. A system according to claim 16, wherein the logic for finding a path for the demand on the auxiliary graph via remaining directed edges comprises logic for finding a path based on the weights.

18. A system according to claim 15, further comprising logic for updating available bandwidth on each directed edge on the auxiliary graph associated with a lightpath based on lightpath configuration for the demand.

19. A system according to claim 15, further comprising:
logic for adding back deleted edges of the auxiliary graph;
logic for selecting a second demand;
logic for deleting directed edges from the auxiliary graph whose available bandwidth is lower than the required bandwidth of the second demand;
logic for finding a second path for the second demand on the auxiliary graph via remaining directed edges;
logic for deleting at least one directed edge of the auxiliary graph on the wavelength layer along the second path;
logic for adding lower layer lightpath edges to the auxiliary graph for a lower layer lightpath for the second path; and
logic for converting lower layer lightpaths to Internet Protocol lightpaths if a conversion condition is satisfied.

20. A system according to claim 19, further comprising logic for determining a total cost for lightpath configurations for the demand and the second demand.

21. A network element according to claim 20, further comprising:
logic for changing the weights for the directed edges;
logic for determining a second total cost for lightpath configurations for the demand and the second demand based on the changed weights; and
logic for selecting a configuration for the network based on a comparison of the total cost to the second total cost.

\* \* \* \* \*